Figure 2:
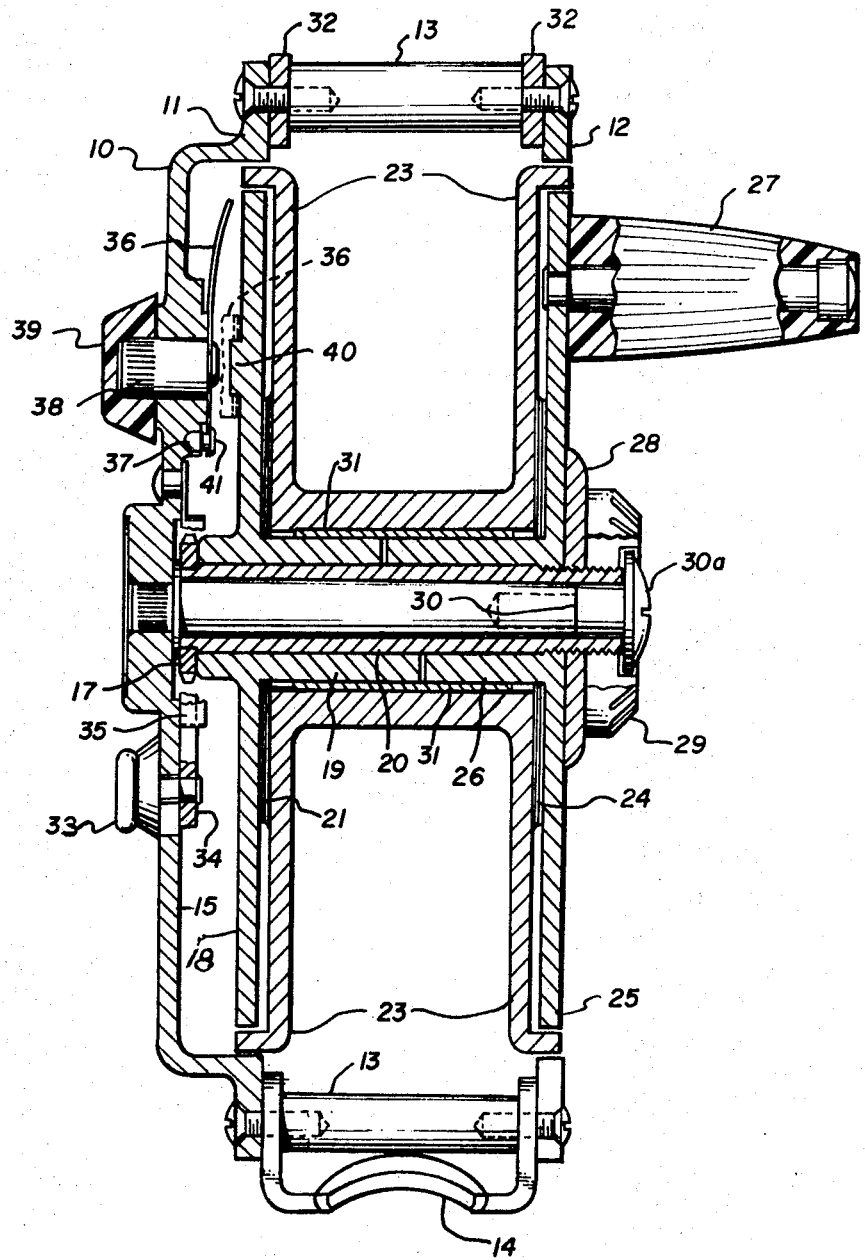

United States Patent

[11] 3,591,107

| [72] | Inventor | Roland W. Ferguson<br>Aurora, Colo. |
|---|---|---|
| [21] | Appl. No. | 798,415 |
| [22] | Filed | Feb. 11, 1969 |
| [45] | Patented | July 6, 1971 |
| [73] | Assignee | Wright & McGill Co.<br>Denver, Colo. |

[54] FLY REEL
9 Claims, 5 Drawing Figs.

[52] U.S. Cl. .................................................. 242/219
[51] Int. Cl. .................................................. A01k 89/02
[50] Field of Search ...................................... 242/84.44,
  84.45, 84.46, 84.54, 84.5, 84.5 A, 84.51, 84.51 A,
  84.2 A, 84.21

[56] References Cited
UNITED STATES PATENTS

| 869,406 | 10/1907 | Atwood | 242/84.5 |
| 2,263,237 | 11/1941 | Fiscus | 242/84.44 |
| 2,462,365 | 2/1949 | Crawford | 242/84.51 |
| 2,546,465 | 3/1951 | Martini | 242/84.21 |
| 2,775,417 | 12/1956 | Freund | 242/84.21 |
| 2,862,679 | 12/1958 | Denison et al. | 242/84.2 |

Primary Examiner—Billy S. Taylor
Attorney—McGrew and Edwards

ABSTRACT: Single action fly reel arranged for spool regulation to include or omit drag. Reel assembly has means selectively operable to control the direction of reel wind so as to permit right- or left-hand operation and includes rigid frame and main shaft acting as bearing for two sideplates carrying interlocking portions of a split shaft with one sideplate also carrying a grip for winding the reel. A line spool is mounted between the sideplates around the split shaft and friction discs are disposed between the sideplates and line spool. Adjustable means are disclosed for applying pressure selectively to the sideplates, line spool and friction discs, thereby to create or eliminate drag.

PATENTED JUL 6 1971
3,591,107
SHEET 1 OF 2
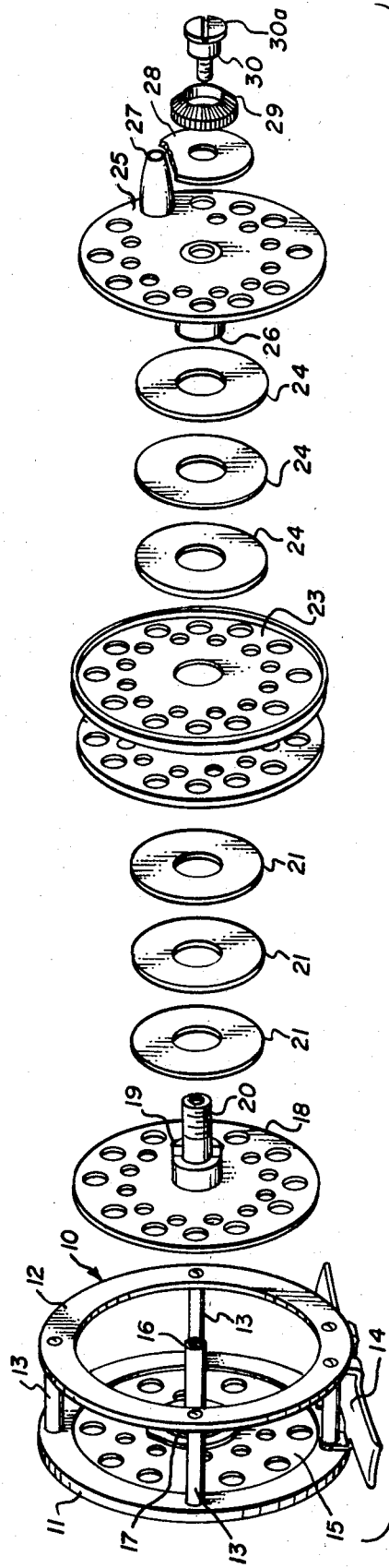
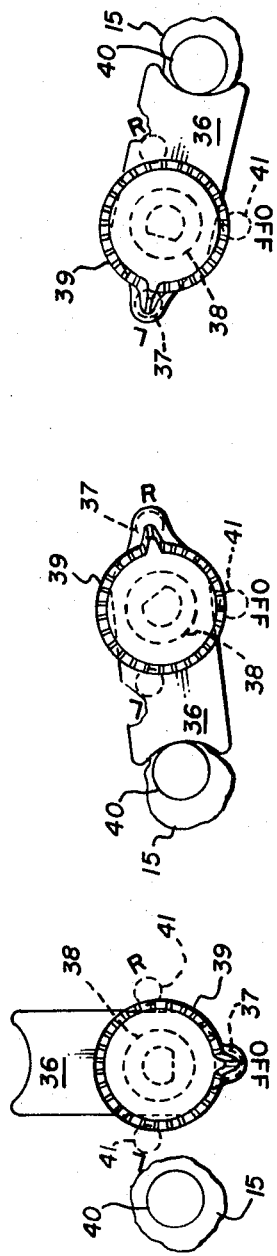
INVENTOR.
Roland W. Ferguson
BY
ATTORNEYS

FLY REEL

This invention relates to fly reels of the single action type which are used primarily in fresh water fishing. It has been common practice in the art to associate a drag mechanism with a line holding spool of a reel so as to change it from a freely rotating member as in casting to a slowly rotating member during retrieve when a fish has been hooked. Such reels employ various arrangements for moving a drag structure against the line-carrying spool so as to require a substantial amount of force to effect rotation of same. This limits the run of the fish when hooked and permits manual rotation of the spool in a retrieving movement at intervals when the fish permits the line to slacken or reduces the force of his movement from the rod.

Usually, the provision of such drag mechanism lessens the free rotation of the spool even when the drag is not being applied and many fishermen who are adept in fly casting prefer a reel which does not have the drag assembly. The present invention represents a departure from prior practice in that it is arranged for use selectively as a single action reel with drag adjustment and a single action reel without drag adjustment. In addition, because of a novel adjustment feature in the reel assembly, it can be selectively operated as a right- or left-hand wind. The effect of this is to make two reels in one.

Another innovation of the present invention is the provision of a novel type of selective control which changes the reel from a drag type to one without drag by simple manipulation. This has the effect of making two reels in one.

Accordingly, it is an object of my invention to provide a simple, durable and efficient single action fly reel with drag adjustment.

Another object of my invention is to provide a simple, durable and efficient single action reel without drag adjustment.

A further object of my invention is to provide a simple, durable and efficient single action reel which can be converted from a right-hand to a left-hand type by changing the directional wind of the line on the reel.

Other objects reside in novel details of construction and novel combinations and arrangements of parts, all of which will be set forth in detail in the course of the following description.

The practice of the invention will be described with reference to the accompanying drawings, in the several views of which like parts bear similar reference numerals. In the drawings:

FIG. 1 is an exploded view of one embodiment of reel assembly according to my invention which is adapted for selective regulation to constitute it a single action fly reel with drag adjustment or a single action fly reel without drag adjustment and also providing a novel control mechanism for selectively controlling the retrieve action to provide a right- or left-hand winding;

FIG. 2 is a vertical central section through a reel of the type shown in FIG. 1 and drawn to an enlarged scale; and FIGS. 3, 4 and 5 are fragmentary sectional views showing respectively the winding control mechanism with retrieve in off position, the winding control mechanism with the retrieve in "R" or right-hand position, and the winding control mechanism with the retrieve in "L" or left-hand position.

As shown in the exploded view, FIG. 1, the fly reel comprises a main frame designated generally 10 and having spaced annular members 11 and 12 interconnected at circumferentially spaced intervals by a plurality of rigid connector members 13, two of which carry a seat member 14 shaped for mounting on the grip of a fly rod (not shown). The space inwardly of annular member 11 is filled by a plate or body portion 15 secured thereon and having a shaft 16 extending through the space between annular members 11 and 12. Preferably, plate portion 15 adjoins a click mechanism 17. A sideplate 18 carrying an interlocking shaft 19 and a drive shaft 20 extending outwardly therefrom is fitted around shaft 16 which acts as a bearing surface. One or a plurality of washers 21 are disposed on shaft 19 adjacent inner sideplate 18.

The reel illustrated in FIG. 1 is arranged to use a line-carrying spool 23 so as to permit the reel to be adapted as a single action reel with drag adjustment or a single action reel without drag adjustment. In the FIG. 1 assembly, spool 23 will be seated on interlocking shaft 19 and its associated interlocking shaft 26 and another washer or preferably a plurality of washers 24 are mounted on said interlocking shaft members and bear against the outer surface of spool 23 as do the other set of washers 21 when the reel is to be operated with drag adjustment. A second sideplate 25 carries the other portion 26 of the interlocking shaft assembly and also is provided with a handle 27 on its exterior surface. The reel assembly is completed by a washer 28 seating against the outer surface of sideplate 25 and engaging a drag adjusting knob 29 which is secured and actuated by a holddown screw 30 having a head 30a fitting in a recessed portion of knob 29 to secure the assembly together. Knob 29 may be preset to provide a desired amount of drag or to leave the reel in condition for free rotation.

Rotation of knob 29 may be used to bring the drag washers 21 and 24 into such close and frictional engagement with the outer sides of line spool 23 as to impede its rotation on shaft 19 and such seating of knob 29 is usually effected in a manual action as soon as the fish strikes and drag is required. After the line has been retrieved, the knob requires no further setting until another fish is caught, requiring more drag on the reel. When it is desired to have a single action reel with drag adjustment, the washers 21 and 24 are mounted in the assembly in the manner just described. However, if it is desired to have a single action reel without drag adjustment, this is accomplished by adjusting knob 29 to maximum tightness, leaving the spool 23 in condition for rotation with the interlocking shaft portions as a single unit within the confines of sideplates 18 and 25. Antireverse 37 must be in off position when this adjustment is made.

Another feature of the present reel construction is that it may be used either as a right- or left-handed reel by simple expedient of changing the directional wind of the line on reel 23 and again such reel may be arranged selectively as one with or without drag adjustment. The control mechanism for the selection of winding direction is illustrated in FIGS. 3, 4 and 5.

As shown in FIG. 2, the line spool 23 seats on a bushing 31 preferably of nylon composition which in turn seats upon the split shaft members 19 and 26. Line guidance in payout and retrieve movements of the reel is provided by the guard members 32 adjoining the uppermost connector member 13 secured between annular members 11 and 12.

In the previous reference to the clicking mechanism, it has been designated generally by reference numeral 17 (FIG. 1) which actually is the click wheel of the click assembly which also includes the control button 33, the click dog 34 and the click spring 35. This unit can be disengaged if desired by movement of click button 33 to the off position. Otherwise, the assembly makes a clicking noise as the handle 27 is rotated in either direction, but it will click only when the handle is rotated and not when the spool is under drag with the handle held stationary.

FIGS. 3, 4 and 5 are views depicting different functional positions of the winding control mechanism and these should be considered in conjunction with the arrangement of component parts as illustrated in FIG. 2. The assembly comprises a control knob 39 which is pressed onto a connecting shaft 38. An antireverse stop button 37 is arranged to move selectively in and out of one of three holes 41 in the main frame 10. Button 37 is secured on an adjustable stop member 36 so that the entire assembly of parts 36, 37, 38 and 39 becomes a single functional unit. The function of stop button 37 is to stop the unit in a preselected position as indicated on the setting of knob 39. As stop 36 is made of spring steel, the button 37 moves easily in and out of the openings 41 until brought to rest in the selected opening for a given knob setting. The sideplate 18 also serves as a part of the control system since it has a lug 40 on its outer surface which is adapted to engage with a substantially rigid edge portion which forms the stop surface of member 36.

If the control unit is moved to the off position as shown in FIG. 3, the lug 40 on plate 18 clears stop 36 and the reel can be rotated in either direction. However, by holding the handle 27, the line spool 23 can slip if line is pulled out. The amount of force required to slip the spool is controlled by the amount of pressure applied through drag adjusting knob 29.

When the control unit is in the "R" position as shown in FIG. 4, the reel will function as a right-hand retrieve flywheel to be operated by the right hand. In this position, the lug 40 will engage the stop 36 when the reel is rotated backwards and stops the winding spool movement. If sufficient force is till applied to the line, then the spool will slip and allow line to be stripped from it. When winding in line, the lug 40 on plate 18 depresses stop 36 slightly, the latter being resilient since it is formed of spring steel, and allows the lug 40 to pass. If the control unit is set by knob 39 to the "L" position shown in FIG. 5, then the reel functions as a left-hand retrieve flywheel with the procedure corresponding to the action described with reference to FIG. 4.

I claim:

1. Single action fly reel arranged for interchangeable spool mounting so as to include or omit drag, comprising a main frame including a pair of spaced annular sides interconnected at circumferentially spaced points by rigid members so as to form a rigid assembly, and at least one of said rigid members having fixed connection with a seat member for mounting the reel on a rod, one said annular side having a body supported in a fixed position within its annulus, a main shaft mounted on said body to extend substantially throughout the space between said annular sides, a first sideplate having an interlocking shaft portion seated on said main shaft for free rotation thereon, a second sideplate having an interlocking shaft portion interfitting with the interlocking shaft portion of said first sideplate, a line spool seated on the interlocking shaft formed by the interfitting shaft portions of said first and second sideplates, washers separating said sideplates and the line spool, one said sideplate having a handle for manual rotation in retrieving fishing line carried by said spool, a holddown screw having a head exteriorly of an associated one of said sideplates and having its inner end engaging said main shaft, adjusting means secured by said screw for selectively permitting free rotation or applying drag during rotation of the line spool, a lug mounted to project from one of said sideplates, and a resilient stop member supported by said main frame to be selectively positionable for selectively engaging said lug to change the wind direction of the line spool for retrieve rotation, said stop member being operable in one selective position to engage said lug when said handle is rotated in a first direction thereby to prevent rotation of said line spool in said first direction and being operable in another selective position to engage said lug when said handle is rotated in a second direction opposite to said first direction thereby to prevent rotation of said line spool in said second direction said stop means being operable in still another position to permit free rotation of said spool in either direction whereby by selectively positioning said stop member the wind direction of said fly reel may be set so as to arrange said fly reel for right- or left-hand operation.

2. A reel as defined in claim 1, in which the main shaft is disposed centrally on said main frame.

3. A reel as defined in claim 1, in which a click device is associated with said main shaft.

4. A reel as defined in claim 1, in which said washers are drag washers.

5. A reel as defined in claim 1, in which said adjusting means for selectively applying drag is an adjusting knob mounted on said drive shaft between the head of said holddown screw and its associated one of said sideplates, and said sideplates, line spool and adjusting knob are cylindrical in shape and are concentric with said main shaft.

6. A reel as defined in claim 1, in which said lug is mounted on the one of said sideplates which is adjacent said body, said lug being mounted on said one sideplate to project away from said line spool towards said body, and said stop member is rotatably mounted on said body adjacent said lug so as to be manually operable.

7. A fly reel, comprising:
rigid frame structure;
spool means for carrying a fishing line, said spool means being mounted for free rotation within said frame structure;
means for selectively rotating said spool means;
lug means mounted to project from said spool means;
stop means mounted on said frame structure to be selectively positionable for engaging said lug means, said stop means being operable in one selective position to prevent rotation of said spool means in a first direction by engaging said lug means upon rotation of said spool means in said first direction and being operable in another selective position to prevent rotation of said spool means in a second direction opposite from said first direction by engaging said lug means upon rotation of said spool means in said second direction whereby said fly reel may be arranged for right- or left-hand operation by selectively positioning said stop means, said stop means being operable in still another position to permit free rotation of said spool means in either direction:
said frame structure includes a central rigid main shaft portion and said spool means includes:
first and second sideplates carrying interfitting shaftlike portions, the shaftlike portions of said sideplates being interfitted and mounted for free rotation on said main shaft portion to form a spoollike structure;
a line spool mounted for free rotation around the shaftlike portions of said sideplates within the spoollike structure formed thereby;
friction discs mounted between said sideplates and said line spool for applying a drag force to said line spool; and
selectively adjustable means for forcing said sideplates towards each other whereby to press said friction discs against said line spool and selectively apply a drag force thereto.

8. The invention recited in claim 7, wherein:
said means for selectively rotating said spool means is a handle mounted on one of said sideplates;
said lug means is mounted on one of said sideplates to project away from said sideplate towards said frame structure; and
said stop means is a resilient member rotatably mounted on said frame structure adjacent said lug means.

9. The invention recited in claim 7, wherein said stop means is comprised of a resilient member rotatably mounted on said frame structure adjacent said lug means, said member having a substantially rigid edge portion operable to engage said lug means, said member being selectively rotatable to position said edge portion in at least three selective positions, in said first position said member having said edge portion positioned in line with the path of rotation of said lug means in a sense to engage said lug means whenever said spool means is rotated in said first direction, in said second position said member having said edge portion positioned in line with the path of rotation of said lug means in a sense to engage said lug means whenever said spool means is rotated in said second direction, in said third position said member having said edge portion positioned out of line with the path of rotation of said lug means whereby said spool means may be selectively rotated in either said first or second directions.